United States Patent [19]

Wilcox

[11] 4,290,171
[45] Sep. 22, 1981

[54] CLAMPING DEVICE

[76] Inventor: Fred F. Wilcox, 1506 Beaver Ave., Des Moines, Iowa 50310

[21] Appl. No.: 20,254

[22] Filed: Mar. 14, 1979

[51] Int. Cl.³ .............................................. B65D 63/00
[52] U.S. Cl. ........................................ 24/18; 24/278; 24/20 LS
[58] Field of Search ...................... 24/18, 19, 278, 279, 24/20 LS, 68 R, 68 AS

[56] References Cited

U.S. PATENT DOCUMENTS

| 1,053,684 | 2/1913 | Vogel | 24/20 LS X |
| 1,752,539 | 4/1930 | Noguchi | 24/18 X |
| 1,773,545 | 8/1930 | Pommer | 24/18 |
| 1,786,107 | 12/1930 | De Vulitch | 24/20 LS |
| 2,134,854 | 11/1938 | Bolster | 24/68 AS X |
| 2,149,395 | 3/1939 | Glynn | 24/278 |
| 2,284,314 | 5/1942 | Wetzler | 24/278 |
| 2,526,055 | 10/1950 | Webb | 24/278 |

*Primary Examiner*—Roy D. Frazier
*Assistant Examiner*—Peter A. Aschenbrenner
*Attorney, Agent, or Firm*—Zarley, McKee, Thomte, Voorhees & Sease

[57] ABSTRACT

A hollow tube contains a longitudinally movable adjustment member having a pair of V-shaped line-engaging openings at its inner end for receiving opposite ends of the line and a manually operable stop on the outer end of the tube threadably engages the adjustment member for moving it outwardly and tightening the line about an article with the line ends being locked in the V-shaped openings by the inside wall of the tube.

11 Claims, 6 Drawing Figures

U.S. Patent  Sep. 22, 1981  4,290,171
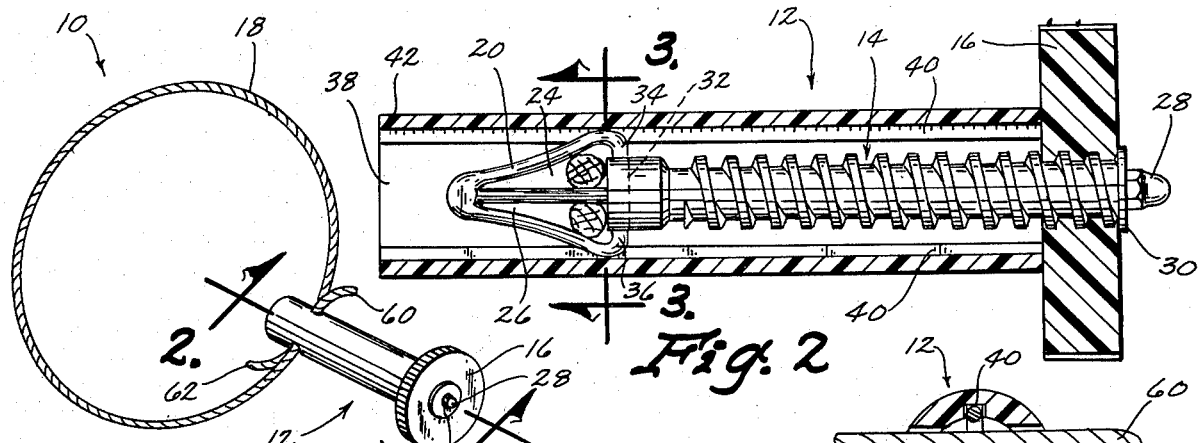
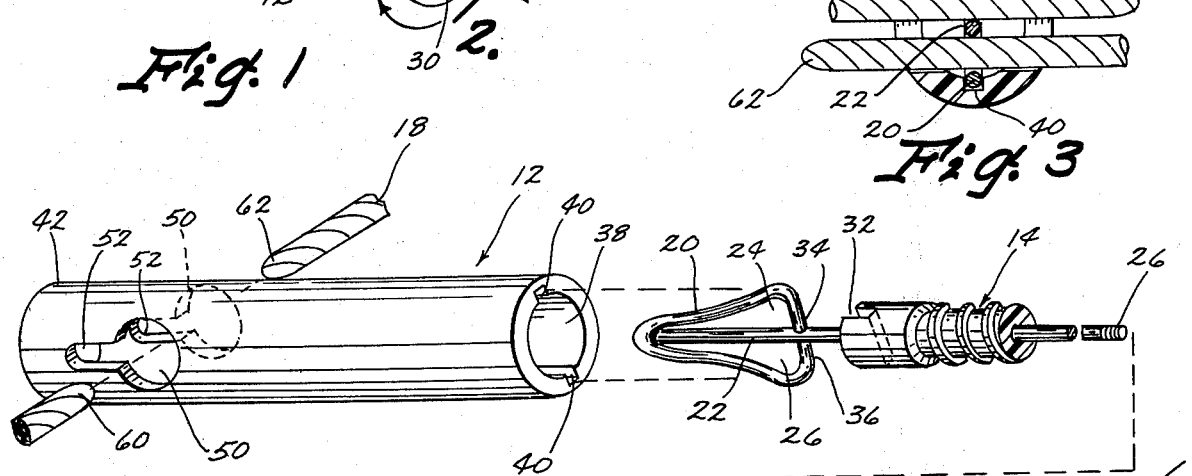
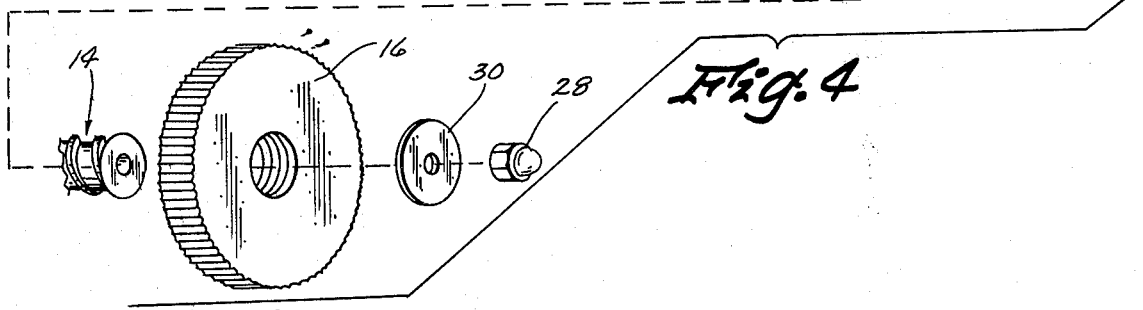

CLAMPING DEVICE

BACKGROUND OF THE INVENTION

Many different types of article clamps are known but they all suffer from one or more serious disadvantages such as being complicated and difficult to operate, expensive and diffcult to manufacture, or inoperative for their intended use. Accordingly, a simple and inexpensive and easy to operate clamping device is needed.

SUMMARY OF THE INVENTION

The clamping device of this invention involves basically four components and is capable of clamping almost any article of any shape or size and may be operated in a matter of moments. A hollow tube contains a longitudinally movable adjustment member having a line-engaging V-shaped means on its inner end while a manually operable stop on the outer end of the tube threadably engages the outer end of the adjustment member to move the adjustment member longitudinally. The line-engaging means includes a pair of V-shaped openings adapted to be in alignment with openings in opposite sidewalls of the tube to receive the opposite ends of the line which are pulled tight about the article to be clamped and upon the adjustment member being retracted or moved outwardly in the tube the line portions in the V-shaped openings are forced into locking engagement therein by the pressure applied by the inside wall of the tubular member.

DESCRIPTION OF THE DRAWINGS

FIG. 1 is a perspective view of the clamping device of this invention.

FIG. 2 is a cross-sectional view taken along line 2—2 in FIG. 1.

FIG. 3 is a cross-sectional view taken along line 3—3 in FIG. 2.

FIG. 4 is an exploded perspective view thereof.

FIG. 5 is a reduced in scale perspective view of the clamping device in use for clamping an article.

FIG. 6 is a cross-sectional view taken along line 6—6 in FIG. 5.

DESCRIPTION OF THE PREFERRED EMBODIMENT

The clamping device of this invention is referred to generally in FIG. 1 by the reference numeral 10 and is shown to include an elongated hollow tubular member 12 in which an elongated adjustment member 14 is positioned for longitudinal movement in response to operation of a manually operable stop member 16 having an inner end in locking engagement with a line 18.

It is seen in FIG. 2 that the adjustment member 14 has a V-shaped inner end 20 formed from rod material. A second rod element 22 bisects the V-shaped end forming two oppositely disposed V-shaped openings 24 and 26. The rod 22 is suitably connected to the adjustment member and as shown extends through the member 14 and has an outer threaded end 26 engaged by a nut 28 on the outer face of the stop 16. A washer 30 is provided between the nut 28 and the outer face of the stop 16.

A slot 32 is formed in the inner end of the adjustment member 14 and receives laterally extending portions 34 and 36 of the rod element 20 adjacent the rod 22.

The tubular member 12 includes an inner wall surface 38 having oppositely disposed longitudinally extending grooves 40 which receive the outer edges of the V-shaped rod member 20, as seen in FIG. 2.

The inner end 42 of the hollow tubular member 14 has oppositely disposed openings 50 from which elongated slots 52 extend toward the inner end 42.

In operation the adjustment member 14 is positioned within the tube 12 such that the V-shaped openings 24 and 26 are aligned with the enlarged openings 50 to receive the opposite ends 60 and 62 of the line 18 whereupon these ends are pulled all the way through and then pulled tight such that the line 18 will snugly embrace an article 70 being clamped, as seen in FIG. 5. When the line is pulled tight about the article it is positioned in the elongated slots 52 which are aligned with the narrow ends of the V-shaped openings 24 and 26 which lockingly engage opposite ends of the line thereby holding the line tight around the article until the adjustment member 14 is operated. The manually operable stop 16 is then rotated to retract the adjustment member 14, as seen in FIG. 5, whereupon the line is pulled into the tube and outwardly with the inside face 38 of the tube locking the line in the V-shaped openings 24 and 26 at the vertex inner end. The inner end 42 presses against the article 70 being clamped and could be provided with any suitable saddle member to matingly engage the article being clamped. Disengagement of the clamping device from the article 70 is easily accomplished by simply reversing the procedure which occurs when the manually operable stop 16 is rotated in the opposite direction or counterclockwise thereby allowing the adjustable member 14 to be moved to the inner end of the tube whereupon the line ends 60 and 62 may be pulled outwardly and allowed to loosen about the article 70.

What is claimed is:

1. A clamping device comprising,
   a length of line having opposite ends,
   an elongated hollow member having inner and outer ends and oppositely disposed sidewalls,
   said hollow member having transversely aligned openings in its opposite sidewalls adjacent its inner end through both of which the ends of said line moveably extend in opposite directions,
   an adjustment member in said hollow member and adapted to move longitudinally thereof, said adjustment member having inner and outer ends, and line-engaging means on the inner end of said adjustment member including an opening means through which said line ends extend, said line-engaging means adapted to cooperate with the inside of said hollow member to lock said line to said line-engaging means as said adjustment member is moved outwardly in said hollow member by the edges of said openings and the side-walls of said hollow member doubling the line back upon its self on opposite sides of side line-engaging means thereby tightening said line about an article being clamped between said line and the inner end of said hollow member.

2. The structure of claim 1 wherein said adjustment means is an elongated threaded shaft having an adjustable threaded stop engaging the other end of said hollow member for screwably moving said shaft longitudinally of said hollow member.

3. The structure of claim 2 wherein the line-engaging means includes a pair of V-shaped openings in which said line ends are positioned and held tight by being pulled into the vertex of each V-shaped opening while being freely movable through the opposite end of said grooves which is wider than said vertex end.

4. The structure of claim 3 wherein said line-engaging means is V-shaped and oppositely disposed grooves are provided in the inside wall of said hollow member in which said V-shaped means is movably received and limited against rotation within said hollow member.

5. The structure of claim 4 wherein said V-shaped line-engaging means is bisected by a rod element thereby forming said pair of V-shaped openings.

6. The structure of claim 5 wherein said openings in the opposite sides of said hollow member include slots extending towards said inner end for receiving said line when said V-shaped openings are aligned with said slots to hold said line prior to said line-engaging means becoming locked onto said line as said adjustment member is moved outwardly in said hollow member.

7. A clamping device for use with a rope of indeterminate length and having a pair of ends to permit continuous adjustment of said rope to effect secure clamping thereby of workpieces of various sizes, said clamping device comprising,
 a hollow, tubular member having a pair of ends and means for receiving the opposite ends of the rope therethrough,
 gripping means positioned within said tube for receiving the opposite ends of said rope, said gripping means having a first portion sized to permit free movement of said rope ends therethrough and a second rope engaging portion for gripping said rope so that it may be drawn into clamping engagement with a workpiece, said gripping means comprising a V-shaped opening with the vertex end of the opening being the second rope engaging portion and the end portion opposite the vertex being the first portion, and
 means for drawing means through said tube to bring the rope into tighter clamping engagement with the workpiece.

8. The device of claim 7 wherein said means for drawing said gripping means through said tube comprises an elongaged, threaded shaft, coupled with said gripping means and a stop provided at one end of said tube, said stop having internal threading complementary to the threading on said shaft being configured to receive said shaft therethrough for screwingly moving said gripping means into and out of alignment with said rope receiving means of said tubular member.

9. A clamping device for use with a rope of indeterminate length and having a pair of ends to permit continuous adjustment of said rope to effect secure clamping thereby of workpieces of various sizes, said clamping device comprising,
 a hollow, tubular member having a pair of ends and means for receiving the opposite ends of the rope therethrough,
 gripping means positioned within said tube for receiving the opposite ends of said rope, said gripping means having a first portion sized to permit free movement of said rope ends therethrough and a second top engaging portion for gripping said rope so that it may be drawn into clamping engagement with a workpiece, said gripping means comprising a pair of V-shaped elements having coplanar, parallel vertices, extending away from said threaded shaft, each V-shaped element being adapted to receive an end of said rope for gripping engagement within its vertex,
 means for drawing said gripping means through said tube to bring the rope into tighter clamping engagement with the workpiece, said means for drawing said gripping means through said tube comprising an elongated, threaded shaft, coupled with said gripping means, and
 a stop provided at one end of said tube, said stop having internal threading complementary to the threading on said shaft and being configured to receive said shaft therethrough for screwingly moving said gripping means into and out of alignment with said rope receiving means of said tubular member.

10. The device of claim 9 wherein said hollow member is provided with a pair of longitudinally extending internal grooves, each groove being configured and positioned to receive a portion of one of said V-shaped elements therewithin, to limit rotation of said gripping means within said hollow member.

11. A clamping device for use with a rope of indeterminate length and having a pair of ends to permit continuous adjustment of said rope to effect secure clamping thereby of workpieces of various sizes, said clamping device comprising,
 a hollow, tubular member having a pair of ends and means for receiving the opposite ends of the rope therethrough,
 gripping means positioned within said tube for receiving the opposite ends of said rope, said gripping means having a first portion sized to permit free movement of said rope ends therethrough and a second rope engaging portion for gripping said rope so that it may be drawn into clamping engagement with a workpiece, said gripping means comprising a pair of V-shaped elements having coplanar, parallel vertices, extending away from said threaded shaft, each V-shaped element being adapted to receive an end of said rope for gripping engagement within its vertex, and
 means for drawing said gripping means through said tube to bring the rope into tighter clamping engagement with the workpiece.

* * * * *